(12) United States Patent
Khorram

(10) Patent No.: US 7,130,601 B2
(45) Date of Patent: Oct. 31, 2006

(54) DETERMINATION OF RECEIVED SIGNAL STRENGTH IN A DIRECT CONVERSION RECEIVER

(75) Inventor: Shahla Khorram, Los Angeles, CA (US)

(73) Assignee: Broadcom Corporation, Irvine, CA (US)

(*) Notice: Subject to any disclaimer, the term of this patent is extended or adjusted under 35 U.S.C. 154(b) by 595 days.

(21) Appl. No.: 10/243,343

(22) Filed: Sep. 13, 2002

(65) Prior Publication Data

US 2004/0203471 A1 Oct. 14, 2004

(51) Int. Cl.
*H04B 17/00* (2006.01)

(52) U.S. Cl. ............... 455/226.2; 455/313; 455/67.16; 455/134; 375/316; 327/58

(58) Field of Classification Search ............... 455/522, 455/134, 161.3, 226.2, 232.1, 355, 323, 313, 455/67.16, 67.11; 370/332, 206, 207; 375/320, 375/353, 329, 332, 331, 316, 340; 327/58–71
See application file for complete search history.

(56) References Cited

U.S. PATENT DOCUMENTS 5,553,081 A * 9/1996 Downey et al. ............ 714/709
5,838,737 A * 11/1998 Yamaguchi et al. ........ 375/331
6,356,747 B1 * 3/2002 Miquel et al. .............. 455/324
6,748,026 B1 * 6/2004 Murakami et al. .......... 375/316

* cited by examiner

Primary Examiner—George Eng
Assistant Examiner—Nam Huynh
(74) Attorney, Agent, or Firm—Garlick Harrison & Markison; Bruce E. Stuckman

(57) ABSTRACT

Determination of a received signal strength indication in a direct conversion receiver begins by determining, at a given time, a $1^{st}$ value to be the larger of the in-phase component of the received signal and the quadrature component of the received signal. The direct conversion receiver then determines a $2^{nd}$ value at the given time to be the smaller of the in-phase component of the received signal and the quadrature component of the received signal. As such, at a given time, the $1^{st}$ and $2^{nd}$ values correspond to the greater and lesser of the in-phase component and quadrature component, respectively. Having obtained these values, the direct conversion receiver then determines the received signal strength indication based on the $1^{st}$ value, the $2^{nd}$ value and an offset value. The offset value provides a scaling of the RSSI value based on the range of the RSSI values.

23 Claims, 6 Drawing Sheets

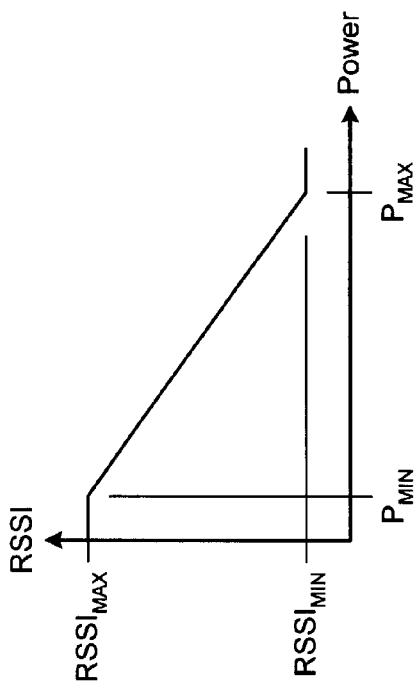

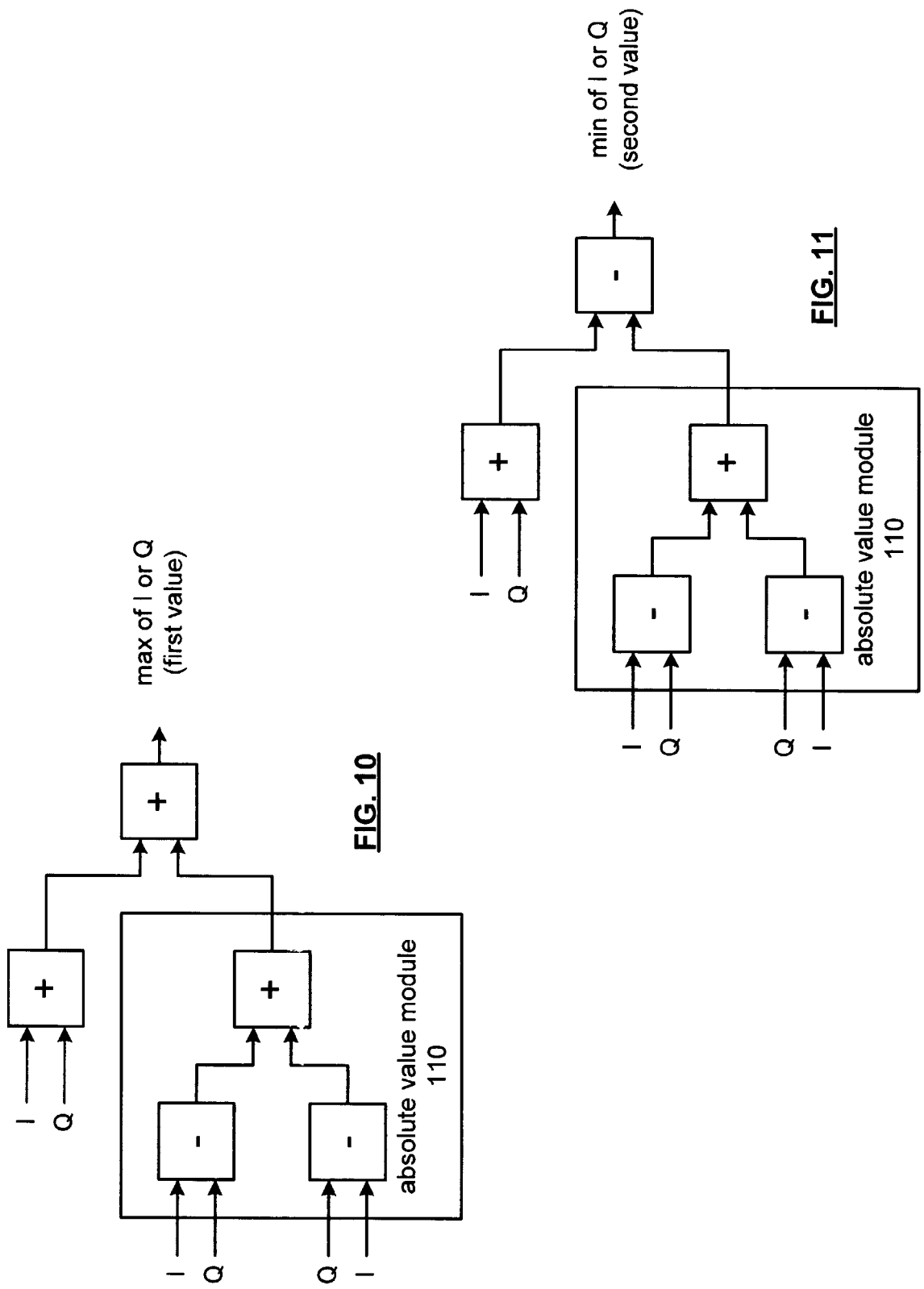

DETERMINATION OF RECEIVED SIGNAL STRENGTH IN A DIRECT CONVERSION RECEIVER

BACKGROUND OF THE INVENTION

1. Technical Field of the Invention

This invention relates generally to wireless communication systems and more particularly to radio frequency integrated circuits used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Many of the components in the transmitter and receiver are adjustable to compensate for integrated circuit process variations, transmit power requirements, and/or varying levels of received signal strength. For example, the low noise amplifier and filtering stages of a receiver are adjustable to accommodate for varying levels of received signal strength. As is known, to adjust the gain of a low noise amplifier and/or filter stage, the signal strength of the received signal needs to be measured.

Typically, the signal strength is measured via a received signal strength indication module, which measures the amplitude (in volts) of the in-phase and quadrature components a received signal and converts the measured voltage into a power level value (in dBm, i.e., milliwatts of power in dB). For example, the received signal strength indication module uses the equation $10 \log (I^2) + 10 \log (Q^2)$ to approximate the equation of $10 \log (I^2+Q^2)$, where I corresponds to the amplitude of the in-phase component of the received signal and Q corresponds to the quadrature phase of the received signal. This approximation provides a reliable RSSI value since the power of I is equal to the power of Q and does not change over time.

In direct conversion receivers (i.e., those that include only one mixing stage and directly convert received RF signals to baseband signals), timely and accurate measure of RSSI is difficult. The difficulty arises when a frequency offset (i.e., the local oscillation of the receiver does not exactly match the local oscillation of the transmitter of the transmitting radio) is present, causing an amplitude modulation of the received signal, which causes the power of I to not always equal the power of Q. As such, the approximation as previously discussed is not directly viable for direct conversion receivers.

One solution for direct conversion receivers is to average the RSSI of a plurality of samples over a period of time greater than the period of the amplitude modulation caused by the frequency offset. However, when the frequency offset is relatively short (e.g., less than a few hundred kilohertz), the time to obtain a reliable average for the RSSI value exceeds the time allocated to make an RSSI measurement, which typically is in the range of about 1–5 microseconds.

Therefore, a need exists for a method and apparatus for determining received signal strength indication within a direct conversion receiver in a timely and efficient manner.

BRIEF SUMMARY OF THE INVENTION

The determination of a received signal strength indication in a direct conversion receiver of the present invention substantially meets these needs and others. In one embodiment, the direct conversion receiver, to measure received signal strength, determines at a given time, a $1^{st}$ value to be the larger of the in-phase component of the received signal and the quadrature component of the received signal. The direct conversion receiver then separately determines a $2^{nd}$ value at the given time to be the smaller of the in-phase component of the received signal and the quadrature component of the received signal. As such, at a given time, the $1^{st}$ and $2^{nd}$ values correspond to the greater and lesser of the in-phase component and quadrature component, respectively. Having obtained these values, the direct conversion receiver then determines the received signal strength indication based on the $1^{st}$ value, the $2^{nd}$ value and an offset value. The offset value provides a scaling of the RSSI value based on the range of the RSSI values.

The determination of the received signal strength indication based on the $1^{st}$, $2^{nd}$ and offset values is predicated on the mathematical expression that $sine^2+cosine^2=1$ and by approximating $10\ log(I^2+Q^2)$. Since the in-phase and quadrature components correspond to sine and cosine wave forms, by taking one sample point of each at a given time, the RSSI value may be accurately approximated in the presence of amplitude modulation caused by frequency offset.

BRIEF DESCRIPTION OF THE SEVERAL VIEWS OF THE DRAWINGS

FIG. 3 is a graph plotting received signal strength indication versus input power in accordance with the present invention;

FIG. 4 is a graph of an amplitude modulated in-phase component of a received signal in accordance with the present invention;

FIG. 5 is a graph of an amplitude modulated quadrature component of a received signal in accordance with the present invention;

FIG. 6 is a graph of received signal strength indication for the in-phase component of FIG. 4;

FIG. 7 is a graph of received signal strength indication for the quadrature component of FIG. 5;

FIG. 10 is a schematic block diagram of a module for determining a $1^{st}$ value in accordance with the present invention;

FIG. 11 is a schematic block diagram of a module for determining a $2^{nd}$ value in accordance with the present invention;

DETAILED DESCRIPTION OF THE INVENTION

Figure 1:
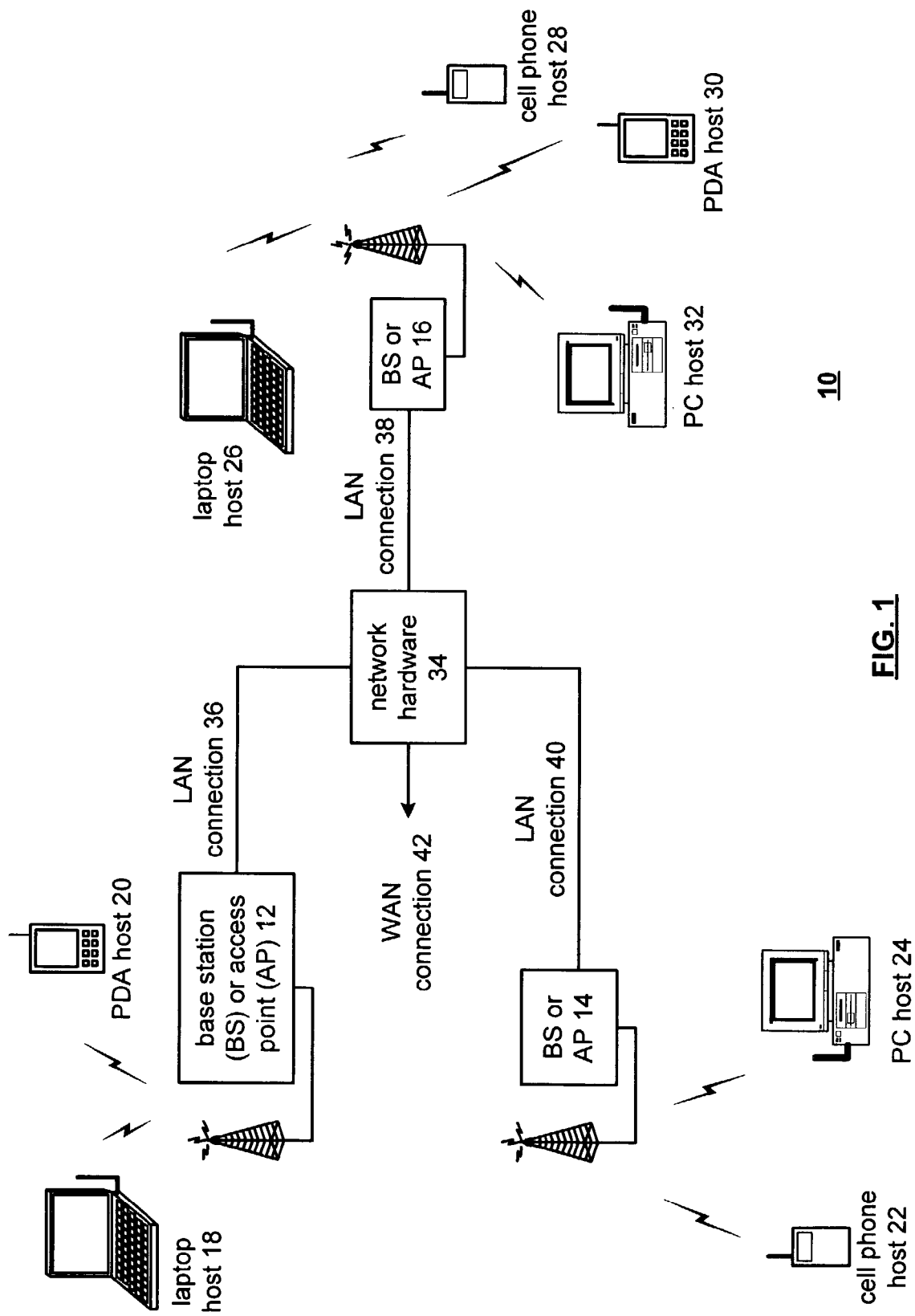
FIG. 1 is a schematic block diagram of a wireless communication system in accordance with the present invention.

FIG. 1 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
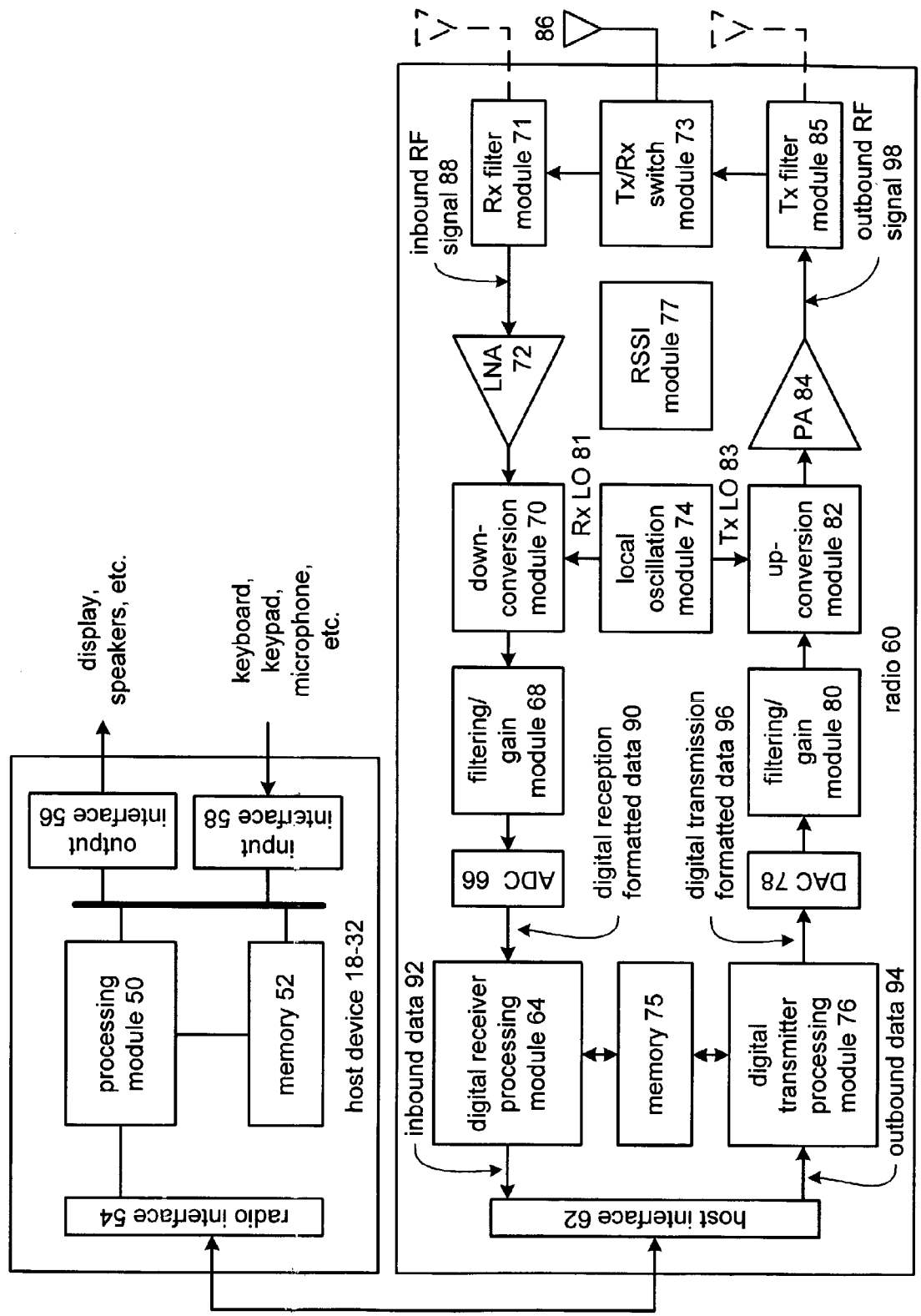
FIG. 2 is a schematic block diagram of a wireless communication device in accordance with the present invention.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a received signal strength indication (RSSI) module 77, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal. The RSSI module 77 measures the RSSI of the received signal, which may be the input or output of the LNA 72 in accordance with the teachings of the present invention.

The analog-to-digital converter 66 converts the filtered inbound signal from the analog domain to the digital domain to produce digital reception formatted data 90. The digital receiver processing module 64 decodes, descrambles, demaps, equalizes channel response, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

FIG. 3 is a graph plotting received signal strength indication versus input power. As shown, the maximum RSSI value corresponds to the minimum input power and the minimum RSSI value corresponds to the maximum input power. In one application, the minimum input power may be −80 dBm and the maximum RSSI value is 1 volt. The maximum power may be −45 dBm and the corresponding RSSI minimum value is 0.2 volts. As one of average skill in the art will appreciate, the RSSI to power curve may have a positive, as opposed to a negative, slope.

FIGS. 4 and 5 are graphical representations of the in-phase and quadrature components of a received signal over time. As shown, the in-phase component of FIG. 4 is a sinusoid waveform while the quadrature component of FIG. 5 is a cosine waveform. The amplitudes of the in-phase component of FIG. 4 and the quadrature component of FIG. 5 are modulated based on the frequency offset between the receiver and the transmitter that transmitted the received signal.

FIG. 6 illustrates the RSSI value for the in-phase component of FIG. 4. As shown, the RSSI value includes amplitude modulation. Similarly, the RSSI value for the quadrature component, as shown in FIG. 7, includes the amplitude modulation. As one of average skill in the art will appreciate, the magnitude of the amplitude modulation increases as the magnitude of the in-phase and quadrature signals increase.

Figure 8:
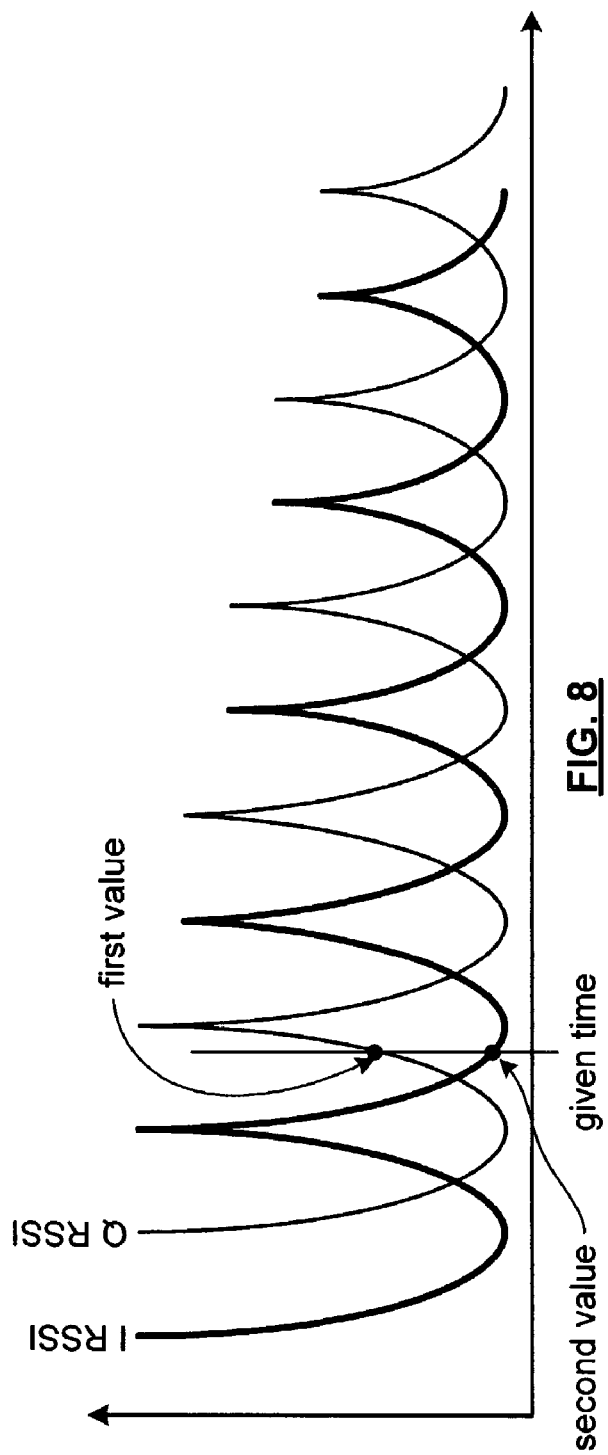
FIG. 8 is an exploded view of the in-phase receive signal strength indication and quadrature receive strength indication of FIGS. 6 and 7.

FIG. 8 is a graph of the in-phase RSSI value and quadrature RSSI value over time. At any given point in time, a $1^{st}$ value and a $2^{nd}$ value are separately determined. Based on these values, an accurate representation of the RSSI may be obtained based on the mathematical principle that $sine^2 + cosine^2 = 1$ and by approximating $10 \log(I^2 + Q^2)$. As shown in this example, the $2^{nd}$ value, which is the minimum of the I and Q RSSI values is the I RSSI value and the $1^{st}$ value, which is the greater of the Q and I values, is the Q value. The determination of the $1^{st}$ and $2^{nd}$ values and the resulting RSSI value will be further described with reference to FIGS. 9–14.

Figure 9:
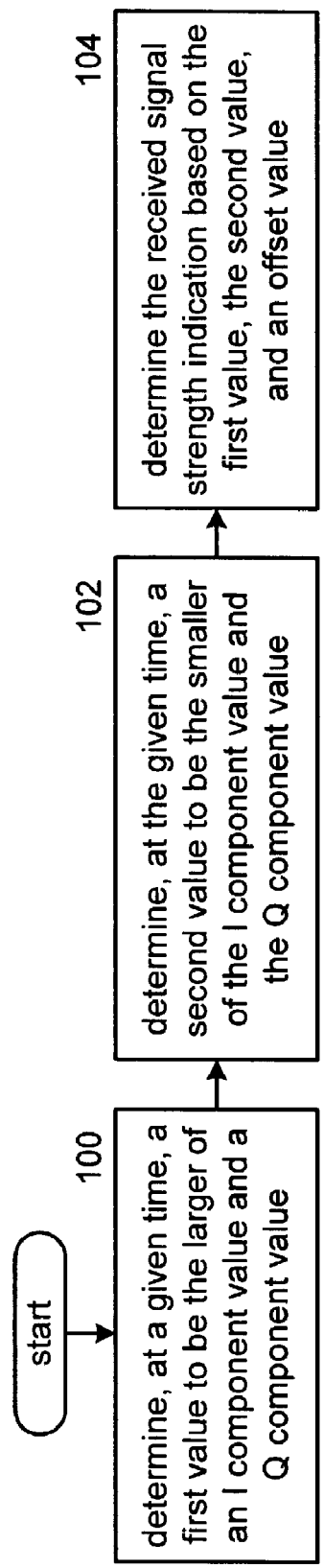
FIG. 9 is a logic diagram of a method for determining received signal strength in a direct conversion receiver in accordance with the present invention.

FIG. 9 is a logic diagram of a method for determining received signal strength indication in a direct conversion receiver. The process begins at Step 100 where, at a given time, a determination is made to obtain a $1^{st}$ value. The $1^{st}$ value is the larger of the in-phase component RSSI value and the quadrature component RSSI value, as illustrated in FIG. 8. The determination of the $1^{st}$ value may be done by adding the in-phase component value with the quadrature component value to produce a summed value. In addition, an absolute value of the in-phase component less the quadrature component is obtained. Finally, to obtain the $1^{st}$ value, the summed value is added with the absolute value to produce the $1^{st}$ value. To obtain the absolute value, the in-phase component value is subtracted from the quadrature component value to produce a $1^{st}$ subtraction value, where when the in-phase component value is greater than the quadrature component value, the $1^{st}$ subtraction value is set to zero. In addition, the quadrature component value is subtracted from the in-phase component value to produce a $2^{nd}$ subtraction value, where, when the quadrature component value is greater than the in-phase component value, the $2^{nd}$ subtraction value is set to zero. The absolute value is then obtained by adding the $1^{st}$ and $2^{nd}$ subtraction values.

The process then proceeds to Step 102 where, at the given time, a $2^{nd}$ value is separately determined to be the smaller of the in-phase component value and the quadrature component value. The $2^{nd}$ value may be determined by adding the in-phase component value with the quadrature component value to produce a summed value. A determination further includes determining an absolute value of the in-phase component minus the quadrature component value. Having obtained the absolute value and the summed value, the absolute value is subtracted from the summed value to produce the $2^{nd}$ value.

The process then proceeds to Step 104 where the received signal strength indication is determined based on the $1^{st}$ value, the $2^{nd}$ value and the offset value. This may be done by adding the offset value to the $2^{nd}$ value to produce an adjusted value. The determination then proceeds by subtracting the adjusted value from the $1^{st}$ value to produce a difference value. The determination further includes multiplying the difference value by a constant to produce a scaled difference value. The received signal strength indication is then obtained by subtracting the scaled difference value from the $2^{nd}$ value. As one of average skill in the art will appreciate, the steps of FIG. 9 may be implemented within the processing modules 64 and/or 76. Alternatively, it may be implemented utilizing discrete components as illustrated in FIGS. 11–14.

FIG. 10 is a sclematic block diagram illustrating a module to determine the $1^{st}$ value, which corresponds to the maximum of the I value or Q value at a given time. As shown, an absolute value module 110 includes two subtraction modules and an addition module. The $1^{st}$ subtraction module subtracts the I component value from the Q component value and produces a zero or greater value. The $2^{nd}$ subtraction module subtracts the I component from the Q component and produces a zero or greater value. The summation module sums the outputs of the subtraction modules to produce the absolute value of the difference between the I and Q components.

The $1^{st}$ of the remaining two adders adds the I and Q component to produce a summed value. The summed value is added, via the other adder, with the absolute value to produce the $1^{st}$ value.

FIG. 11 is a schematic block diagram of a module for determining the $2^{nd}$ value, which corresponds to the minimum of the I component value or Q component value at the given time. The $2^{nd}$ value module includes the absolute value module 110, an adder, and a subtraction module. The adder adds the I component value and Q component value to produce a summed value. The subtraction module subtracts the absolute value from the summed to produce the $2^{nd}$ value.

Figure 12:
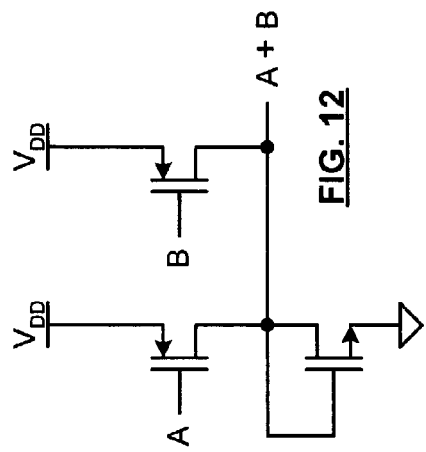
FIG. 12 is a schematic block diagram of an adder in accordance with the present invention.

FIG. 12 is a schematic block diagram of an adder module that may be used in FIG. 10 or 11. As shown, the two inputs are received via the gates of P-channel transistors and the result is a summed representation of the gate inputs. As one of average skill in the art will appreciate, N-channel transistors may be used in place of P-channel transistors with the plurality of the circuitry reversed.

Figure 13:
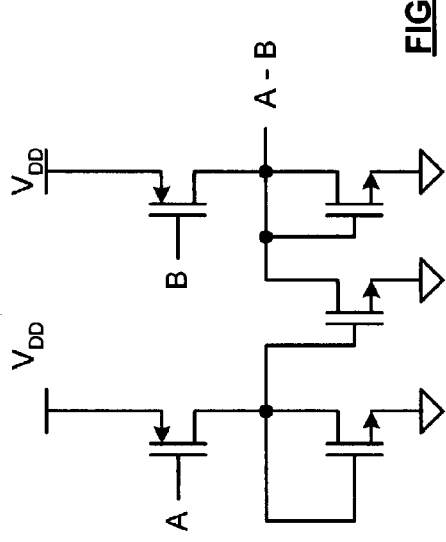
FIG. 13 is a schematic block diagram of a subtraction module in accordance with the present invention.

FIG. 13 is a schematic block diagram of a subtraction module that may be used in FIG. 10 or 11. As shown, the resulting output subtracts the input of the $2^{nd}$ P-channel transistor from the input of the $1^{st}$ P-channel transistor. As one of average skill in the art will appreciate, N-channel transistors may be used in place of the P-channel transistors with flipping the plurality of the circuit.

Figure 14:
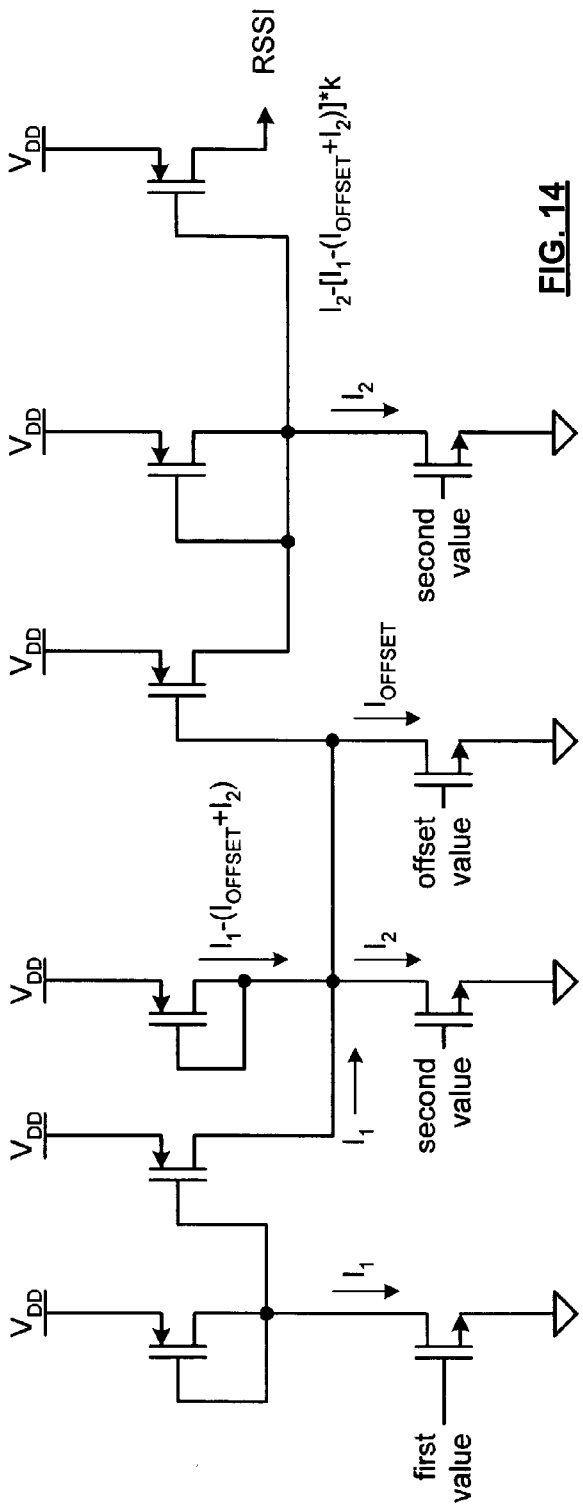
FIG. 14 is a schematic block diagram of a module for determining received signal strength indication in accordance with the present invention.

FIG. 14 is a schematic block diagram of a module for determining the RSSI value based on the $1^{st}$ value, $2^{nd}$ value and offset values. As shown, the RSSI module includes a plurality of P-channel transistors and a plurality of N-channel transistors. The currents produced by the corresponding transistors are labeled with respect to the inputs of the gates of the N-channel transistors. As such, the resulting output RSSI value is based on the $2^{nd}$ value minus [the $1^{st}$ value minus (the offset value+the $2^{nd}$ value)] times a constant.

The preceding discussion has presented a method and apparatus for determining received signal strength in a direct conversion receiver. By utilizing the concept of $sine^2 + cosine^2 = 1$ and $10 \log(I^2 + Q^2)$ a fast and efficient measure of received signal strength may be obtained in the presence of frequency offset. As one of average skill in the art will appreciate, other embodiments may be derived from the teachings of the present invention, without deviating from the scope of the claims.

What is claimed is:

1. A method for determining received signal strength in a direct conversion receiver, the method comprises: determining, at a given time, a first value to be the larger of an in-phase component value and a quadrature component value of a down-converted baseband signal; determining, at the given time, a second value to be the smaller of the in-phase component value and the quadrature component value of the down-converted baseband signal; and determining the received signal strength indication based on the first value, the second value, and a frequency offset value.

2. The method of claim 1, wherein the determining the first value further comprises:

adding the in-phase component value with the quadrature component value to produce a summed value;
determining an absolute value of the in-phase component value minus the quadrature component value; and
adding the summed value and the absolute value to produce the first value.

3. The method of claim 2, wherein the determining the absolute value further comprises:
subtracting the in-phase component value from the quadrature component value to produce a first subtraction value, wherein, when the inphase component value is greater than the quadrature component value, the first subtraction value is set to zero;
subtracting the quadrature component value from the in-phase component value to produce a second subtraction value, wherein, when the quadrature component value is greater than the quadrature component value, the second subtraction value is set to zero; and
adding the first and second subtraction values to produce the absolute value.

4. The method of claim 1, wherein the determining the second value further comprises:
adding the in-phase component value with the quadrature component value to produce a summed value;
determining an absolute value of the in-phase component value minus the quadrature component value; and
subtracting the absolute value from the summed value to produce the second value.

5. The method of claim 1, wherein the determining the received signal strength indication further comprises: adding the frequency offset value to the second value to produce an adjusted value; subtracting the adjusted value from the first value to produce a difference value; multiplying the difference value by a constant to produce a scaled difference value; and subtracting the scaled difference value from the second value to produce the received signal strength indication.

6. An apparatus for determining received signal strength in a direct conversion receiver, the apparatus comprises: means for determining, at a given time, a first value to be the larger of an in-phase component value and a quadrature component value of a down-converted baseband signal; means for determining, at the given time, a second value to be the smaller of the in-phase component value and the quadrature component value of the down-converted baseband signal; and means for determining the received signal strength indication based on the first value, the second value, and a frequency offset value.

7. The apparatus of claim 6, wherein the means for determining the first value further comprises:
a first adder for adding the in-phase component value with the quadrature component value to produce a summed value;
an absolute value module for determining an absolute value of the in-phase component value minus the quadrature component value; and
a second adder for adding the summed value and the absolute value to produce the first value.

8. The apparatus of claim 7, wherein the absolute value module further comprises:
a first subtraction module for subtracting the in-phase component value from the quadrature component value to produce a first subtraction value, wherein, when the in-phase component value is greater than the quadrature component value, the first subtraction value is set to zero;

a second subtraction module for subtracting the quadrature component value from the in-phase component value to produce a second subtraction value, wherein, when the quadrature component value is greater than the quadrature component value, the second subtraction value is set to zero; and
a third adder for adding the first and second subtraction values to produce the absolute value.

9. The apparatus of claim. 8, wherein each of the first and second subtraction modules further comprises:
a first input transistor having a gate, a drain, and a source, wherein the gate of the first input transistor is operably coupled to receive the in-phase component value or the quadrature component value and the source of the first input transistor is operably coupled to a supply voltage;
a second input transistor having a gate, a drain, and a source, wherein the gate of the second input transistor is operably coupled to receive the quadrature component value or the in-phase component value and the source of the second input transistor is operably coupled to the supply voltage;
a load transistor having a gate, a drain, and a source, wherein the drain of the load transistor is coupled to the gate and the drain of the load transistor is operably coupled to the drain of the second input transistor and the source of the load transistor is coupled to a supply return voltage;
a current mirror transistor having a gate, a drain, and a source, wherein the gate of the current mirror transistor is coupled to the gate of the load transistor, the source of the current mirror transistor is coupled to the supply return voltage, and the drain of the current mirror transistor is coupled to the drain of the first input transistor; and
output transistor having a gate, a drain, and a source, wherein the source of the output transistor is coupled to the supply return voltage, the gate and the drain of the output transistor are coupled to the drain of the first input transistor, wherein the drain of the output transistor provides an output of the respective subtraction module.

10. The apparatus of claim 9, wherein the third adder further comprises:
a first adder input transistor having a gate, a drain, and a source, wherein the gate of the first adder input transistor is coupled to receive the first subtraction value and the source of the first adder input transistor is coupled to the supply voltage;
a second adder input transistor having a gate, a drain, and a source, wherein the gate of the second adder input transistor is coupled to receive the second subtraction value, the source of the second adder input transistor is coupled to the supply voltage, and the drains of the first and second adder input transistors are coupled together; and
an adder output transistor having a gate, a drain, and a source, wherein the gate and the drain of the adder output transistor are operably coupled to the drains of the first and second adder input transistors and the source of the adder output transistor is coupled to the supply return voltage, wherein the drain of the adder output transistor provides an output for the third adder.

11. The apparatus of claim 7, wherein each of the first and second adders further comprises:
a first input transistor having a gate, a drain, and a source, wherein the gate of the first input transistor is coupled to receive the first value or the summed value and the source of the first input transistor is coupled to a supply voltage;

a second input transistor having a gate, a drain, and a source, wherein the gate of the second input transistor is coupled to receive the second value or the absolute value, the source of the second input transistor is coupled to the supply voltage, and the drains of the first and second input transistors are coupled together; and an output transistor having a gate, a drain, and a source, wherein the gate and the drain of the output transistor are operably coupled to the drains of the first and second input transistors and the source of the output transistor is coupled to a supply return voltage, wherein the drain of the output transistor provides an output for the respective adder.

12. The apparatus of claim 6, wherein the means for determining the second value further comprises:

an adder for adding the in-phase component value with the quadrature component value to produce a summed value;

an absolute value module for determining an absolute value of the in-phase component value minus the quadrature component value; and a subtraction module for subtracting the absolute value from the summed value to produce the second value.

13. The apparatus of claim 6, wherein the means for determining the received signal strength indication further comprises: an adder for adding the frequency offset value to the second value to produce an adjusted value; a first subtraction module for subtracting the adjusted value from the first value to produce a difference value; a multiplying module for multiplying the difference value by a constant to produce a scaled difference value; and a second subtraction module for subtracting the scaled difference value from the second value to produce the received signal strength indication.

14. The apparatus of claim 6, wherein the means for determining the received signal strength indication further comprises: first input transistor having a gate, a drain, and a source, wherein the gate of the first input transistor is coupled to receive the first value and the source of the first input transistor is coupled to a supply return voltage; second input transistor having a gate, a drain, and a source, wherein the gate of the second input transistor is coupled to receive the second value and the source of the second input transistor is coupled to the supply return voltage; third input transistor having a gate, a drain, and a source, wherein the gate of the third input transistor is coupled to receive the second value and the source of the third input transistor is coupled to the supply return voltage; frequency offset input transistor having a gate, a drain, and a source, wherein the gate of the frequency offset input transistor is coupled to receive the frequency offset value, the source of the frequency offset input transistor is coupled to the supply return voltage, and the drain of the frequency offset input transistor is coupled to the drain of the second input transistor; first load transistor having a gate, a drain, and a source, wherein the gate and the drain of the first load transistor are coupled to the drain of the first input transistor and the source of the first load transistor is coupled to a supply voltage; second load transistor having a gate, a drain, and a source, wherein the gate and the drain of the second load transistor are coupled to the drain of the second input transistor and the source of the second load transistor is coupled to the supply voltage; third load transistor having a gate, a drain, and a source, wherein the gate and the drain of the third load transistor are coupled to the drain of the third input transistor and the source of the third load transistor is coupled to the supply voltage; first mirror transistor having a gate, a drain, and a source, wherein the gate of the first mirror transistor is coupled to the drain of the first input transistor, the source of the first mirror transistor is coupled to the supply voltage, and the drain of the first mirror transistor is coupled to the drain of the second input transistor; second mirror transistor having a gate, a drain, and a source, wherein the gate of the second mirror transistor is coupled to the drain of the second input transistor, the source of the second mirror transistor is coupled to the supply voltage, and the drain of the second mirror transistor is coupled to the drain of the third input transistor; and output transistor having a gate, a drain, and a source, wherein the gate of the output transistor is coupled to the drain of the third input transistor, the source of the output transistor is coupled to the supply voltage, and the drain of the output transistor provides the received signal strength indication.

15. A radio frequency integrated circuit (RFIC) comprises: transmitter section operably coupled to convert outbound data into outbound radio frequency (RF) signals; receiver section operably coupled to convert inbound RF signals into inbound data; and received signal strength module operably coupled to determine a received signal strength indication of the inbound RF signals, wherein the received signal strength module includes: in-phase received signal strength indicator (RSSI) to provide a measure of an in-phase component of a baseband representation of the inbound RF signals to produce an in-phase component value; quadrature RSSI to provide a measure of a quadrature component of the baseband representation of the inbound RF signals to produce a quadrature component value; means for determining, at a given time, a first value to be the larger of the in-phase component value and the quadrature component value; means for determining, at the given time, a second value to be the smaller of the in-phase component value and the quadrature component value; and means for determining the received signal strength indication based on the first value, the second value, and a frequency offset value.

16. The RFIC of claim 15, wherein the means for determining the first value further comprises:

a first adder for adding the in-phase component value with the quadrature component value to produce a summed value;

an absolute value module for determining an absolute value of the in-phase component value minus the quadrature component value; and a second adder for adding the summed value and the absolute value to produce the first value.

17. The RFIC of claim 16, wherein the absolute value module further comprises:

a first subtraction module for subtracting the in-phase component value from the quadrature component value to produce a first subtraction value, wherein, when the in-phase component value is greater than the quadrature component value, the first subtraction value is set to zero;

a second subtraction module for subtracting the quadrature component value from the in-phase component value to produce a second subtraction value, wherein, when the quadrature component value is greater than the quadrature component value, the second subtraction value is set to zero; and a third adder for adding the first and second subtraction values to produce the absolute value.

18. The RFIC of claim 17, wherein each of the first and second subtraction modules further comprises:
- a first input transistor having a gate, a drain, and a source, wherein the gate of the first input transistor is operably coupled to receive the in-phase component value or the quadrature component value and the source of the first input transistor is operably coupled to a supply voltage;
- a second input transistor having a gate, a drain, and a source, wherein the gate of the second input transistor is operably coupled to receive the quadrature component value or the in-phase component value and the source of the second input transistor is operably coupled to the supply voltage;
- a load transistor having a gate, a drain, and a source, wherein the drain of the load transistor is coupled to the gate and the drain of the load transistor is operably coupled to the drain of the second input transistor and the source of the load transistor is coupled to a supply return voltage;
- a current mirror transistor having a gate, a drain, and a source, wherein the gate of the current mirror transistor is coupled to the gate of the load transistor, the source of the current mirror transistor is coupled to the supply return voltage, and the drain of the current mirror transistor is coupled to the drain of the first input transistor; and
- output transistor having a gate, a drain, and a source, wherein the source of the output transistor is coupled to the supply return voltage, the gate and the drain of the output transistor are coupled to the drain of the first input transistor, wherein the drain of the output transistor provides an output of the respective subtraction module.

19. The RFIC of claim 18, wherein the third adder further comprises:
- a first adder input transistor having a gate, a drain, and a source, wherein the gate of the first adder input transistor is coupled to receive the first subtraction value and the source of the first adder input transistor is coupled to the supply voltage;
- a second adder input transistor having a gate, a drain, and a source, wherein the gate of the second adder input transistor is coupled to receive the second subtraction value, the source of the second adder input transistor is coupled to the supply voltage, and the drains of the first and second adder input transistors are coupled together; and
- an adder output transistor having a gate, a drain, and a source, wherein the gate and the drain of the adder output transistor are operably coupled to the drains of the first and second adder input transistors and the source of the adder output transistor is coupled to the supply return voltage, wherein the drain of the adder output transistor provides an output for the third adder.

20. The RFIC of claim 16, wherein each of the first and second adders further comprises:
- a first input transistor having a gate, a drain, and a source, wherein the gate of the first input transistor is coupled to receive the first value or the summed value and the source of the first input transistor is coupled to a supply voltage;
- a second input transistor having a gate, a drain, and a source, wherein the gate of the second input transistor is coupled to receive the second value or the absolute value, the source of the second input transistor is coupled to the supply voltage, and the drains of the first and second input transistors are coupled together; and
- an output transistor having a gate, a drain, and a source, wherein the gate and the drain of the output transistor are operably coupled to the drains of the first and second input transistors and the source of the output transistor is coupled to a supply return voltage, wherein the drain of the output transistor provides an output for the respective adder.

21. The RFIC of claim 15, wherein the means for determining the second value further comprises:
- an adder for adding the in-phase component value with the quadrature component value to produce a summed value;
- an absolute value module for determining an absolute value of the in-phase component value minus the quadrature component value; and
- a subtraction module for subtracting the absolute value from the summed value to produce the second value.

22. The RFIC of claim 15, wherein the means for determining the received signal strength indication further comprises: an adder for adding the frequency offset value to the second value to produce an adjusted value; a first subtraction module for subtracting the adjusted value from the first value to produce a difference value; a multiplying module for multiplying the difference value by a constant to produce a scaled difference value; and a second subtraction module for subtracting the scaled difference value from the second value to produce the received signal strength indication.

23. The RFIC of claim 15, wherein the means for determining the received signal strength indication further comprises: first input transistor having a gate, a drain, and a source, wherein the gate of the first input transistor is coupled to receive the first value and the source of the first input transistor is coupled to a supply return voltage; second input transistor having a gate, a drain, and a source, wherein the gate of the second input transistor is coupled to receive the second value and the source of the second input transistor is coupled to the supply return voltage; third input transistor having a gate, a drain, and a source, wherein the gate of the third input transistor is coupled to receive the second value and the source of the third input transistor is coupled to the supply return voltage; frequency offset input transistor having a gate, a drain, and a source, wherein the gate of the frequency offset input transistor is coupled to receive the frequency offset value, the source of the frequency offset input transistor is coupled to the supply return voltage, and the drain of the frequency offset input transistor is coupled to the drain of the second input transistor; first load transistor having a gate, a drain, and a source, wherein the gate and the drain of the first load transistor are coupled to the drain of the first input transistor and the source of the first load transistor is coupled to a supply voltage; second load transistor having a gate, a drain, and a source, wherein the gate and the drain of the second load transistor are coupled to the drain of the second input transistor and the source of the second load transistor is coupled to the supply voltage; third load transistor having a gate, a drain, and a source, wherein the gate and the drain of the third load transistor are coupled to the drain of the third input transistor and the source of the third load transistor is coupled to the supply voltage; first mirror transistor having a gate, a drain, and a source, wherein the gate of the first mirror transistor is coupled to the drain of the first input transistor, the source of the first mirror transistor is coupled to the supply voltage, and the drain of the first mirror transistor is coupled to the drain of the second input transistor; second mirror transistor having a gate, a drain, and a source, wherein the gate of the second mirror transistor is coupled to the drain of the second input transistor, the source of the second mirror transistor is coupled to the supply voltage, and the drain of the second mirror transistor is coupled to the drain of the third input transistor; and output transistor having a gate, a drain, and a source, wherein the gate of the output transistor is coupled to the drain of the third input transistor, the source of the output transistor is coupled to the supply voltage, and the drain of the output transistor provides the received signal strength indication.

* * * * *